United States Patent
Sugitani

(10) Patent No.: US 7,073,722 B2
(45) Date of Patent: Jul. 11, 2006

(54) NON-CONTACT TYPE COMMUNICATION CARD AND NON-CONTACT COMMUNICATION APPARATUS CONTROL METHOD

(75) Inventor: Kazunori Sugitani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/718,604

(22) Filed: Nov. 24, 2003

(65) Prior Publication Data

US 2004/0104275 A1    Jun. 3, 2004

(30) Foreign Application Priority Data

Nov. 28, 2002  (JP)  .............. 2002-345400

(51) Int. Cl.
*G06K 19/06*  (2006.01)
(52) U.S. Cl. ................................ 235/492
(58) Field of Classification Search ........... 235/492, 235/380, 382, 382.5, 384
See application file for complete search history.

(56) References Cited

U.S. PATENT DOCUMENTS

| | | | |
|---|---|---|---|
| 5,191,192 A * | 3/1993 | Takahira et al. | 235/375 |
| 5,241,161 A * | 8/1993 | Zuta | 235/382 |
| 5,378,887 A * | 1/1995 | Kobayashi | 235/492 |
| 5,530,702 A * | 6/1996 | Palmer et al. | 235/385 |
| 5,698,837 A * | 12/1997 | Furuta | 235/492 |
| 5,955,961 A * | 9/1999 | Wallerstein | 235/380 |
| 5,984,175 A * | 11/1999 | Popp | 235/375 |
| 6,631,848 B1 * | 10/2003 | Gaultier | 235/492 |
| 6,724,103 B1 * | 4/2004 | Parrault | 235/492 |
| 6,729,550 B1 * | 5/2004 | Seita et al. | 235/492 |

FOREIGN PATENT DOCUMENTS

| | | | |
|---|---|---|---|
| JP | 08147509 A * | 6/1996 | |
| JP | 08213942 A * | 8/1996 | |
| JP | 11007556 A * | 1/1999 | |
| JP | 2000172888 A * | 6/2000 | |
| JP | 2001283161 A * | 10/2001 | |

* cited by examiner

Primary Examiner—Uyen-Chau N. Le
(74) Attorney, Agent, or Firm—Fitzpatrick, Cella, Harper & Scinto

(57) ABSTRACT

This disclosure relates to the prevention of theft of information from the information stored in a card which can perform non-contact communication. A non-contact communication card having an interface for communicating information in a non-contact state communicates with, for example, an external non-contact communication apparatus only within a designated period of time. A user may be allowed to control the execution of non-contact communication by providing a card with an input component which designates permission/prohibition of communication. Providing the card with a recording component which records a communication log allows the user to check which kinds of non-contact communication have been executed.

18 Claims, 9 Drawing Sheets

NON-CONTACT TYPE COMMUNICATION CARD AND NON-CONTACT COMMUNICATION APPARATUS CONTROL METHOD

FIELD OF THE INVENTION

The present invention relates to the transmission/reception of information stored in a card (or an apparatus) capable of non-contact communication, such as an IC card.

BACKGROUND OF THE INVENTION

Conventionally, contact type cards designed to read magnetically stored information have been mainly used as cards used for automatic ticket gate systems in railroads and entrance control systems in research laboratories and the like. Recently, however, non-contact type cards (IC cards and the like) have been likely to be used. An advantage of a non-contact type is that the user need not take out a commuter pass or card from a pocket or handbag. Even if the user needs to take out such a card from the bag, information can be read when he/she only holds up the card against a reading apparatus. There is no need to make the card pass through the apparatus. In addition, the time taken to read information can be shortened. Furthermore, wear in the card can be prevented. Moreover, a large amount of information can be stored in an IC card or the like.

As described above, a non-contact type card is excellent in operability and can store a large amount of information. On the other hand, information may be read out from the card at any moment. For example, as non-contact type cards are expected to become multifunctional more and more in the future, IC cards equipped with railroad commuter pass applications may also be equipped with credit card applications and the like. In this case, in addition to holder's names, station names, and validity terms, other important information (e.g., credit information) may be stored in non-contact type cards. If important information is stolen from such a non-contact type card, the holder cannot know when and where the information was stolen, and the information may be illicitly used before the holder knows it.

SUMMARY OF THE INVENTION

Accordingly, the present invention provides, for example, a technique of suppressing theft of information from a card designed to perform non-contact communication.

According to the invention, a non-contact type communication card having a communication interface for non-contact communication of information is controlled to communicate with an external non-contact communication apparatus, for example, only within a designated period of time.

In addition, with an arrangement based on any one of the embodiments to be described later, the present invention can solve at least one of the above problems or other problems.

Other features and advantages of the present invention will be apparent from the following description taken in conjunction With the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

An outline of this embodiment will be described first. In the embodiment, a railroad commuter pass is used as an card application of a non-contact type card (e.g., an IC card). (Although a commuter pass will be described in the embodiment, the present invention is not limited to this and can be applied to other kinds of card applications.) In the embodiment, when the holder of a non-contact type card equipped with a commuter pass application passes through a ticket gate to take a train, the ticket gate transmits, to the commuter pass application, a signal for requesting the application to return information indicating an entrainment section or valid section and adult or minor. In response to this signal, the commuter pass application transmits requested information to the ticket gate. According to the embodiment, at this time, the requested information can be displayed on the display unit of the commuter pass. If the user does not want to transmit information, he/she may set the transmission of information in the OFF state by using a hardware switch or software switch. In addition, the user may set the time when transmission of information is permitted, thereby allowing information to be transmitted at only the set time. Furthermore, the transmission time of information and the contents of the transmitted information may be stored in a memory. This allows the stored information to be displayed on the display unit of the commuter pass afterward or to be transferred to a personal computer to be managed. Moreover, the user may designate in advance information that may be transmitted unconditionally, e.g., information with low confidentiality. The user may also designate information, e.g. important personal information, is permitted to be transmitted only when a specific condition is satisfied.

Figure 1:
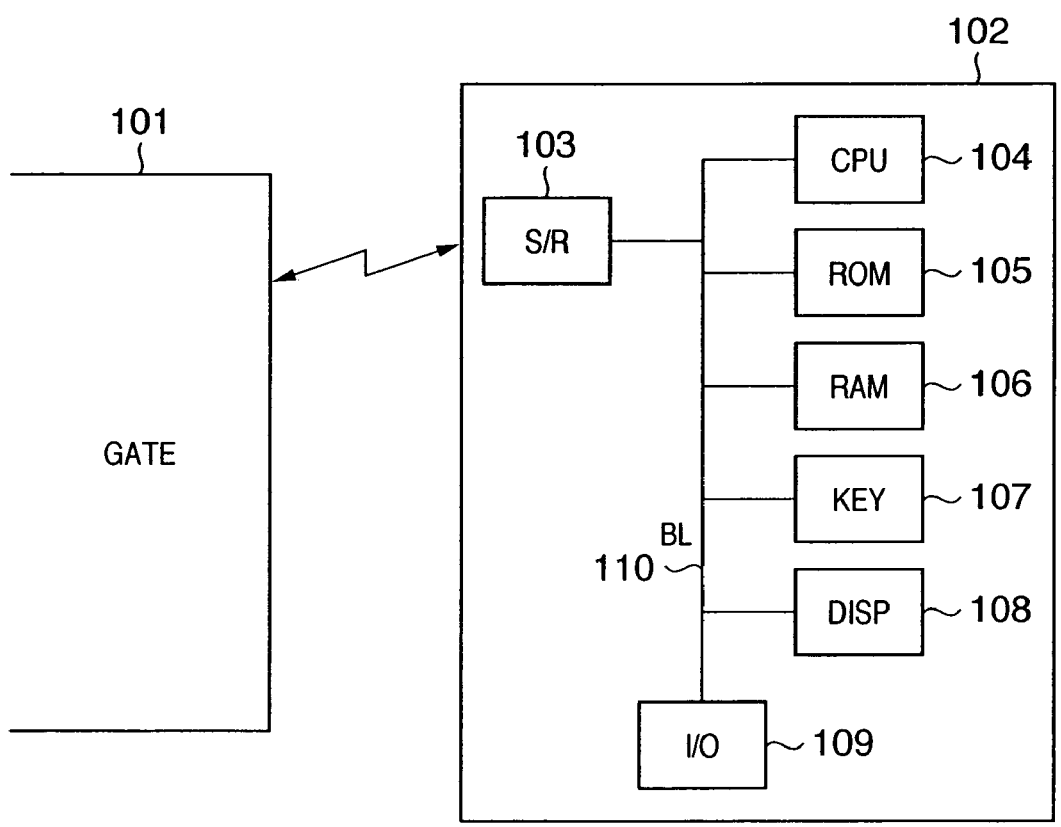
FIG. 1 is a block diagram showing an exemplary arrangement of this embodiment.

This embodiment will be described in detail below. FIG. 1 is a block diagram showing the exemplary arrangement of the embodiment. Reference numeral 101 denotes a ticket gate which transmits and receives information.

Reference numeral 102 denotes a non-contact type card equipped with a commuter pass application,-which may transmit/receive signals to/from the ticket gate. The non-contact type card 102 may also display characters, images, and the like on a display unit, and can accept operation by keys. Reference numeral 103 denotes a transmission/reception unit which has an antenna capable of exchanging information in a non-contact state; 104, a central processing unit (CPU) which controls various kinds of devices and executes program instructions; 105, a read only memory (ROM) in which programs and fonts are stored; and 106, a random access memory (RAM) (or a nonvolatile memory such as a flash memory) in which data such as information about the holder of the commuter pass and a transmission log are stored. Note that the RAM 106 may include a DRAM serving as a work area for the CPU 104 and a flash memory for storing various kinds of data. Reference numeral 107 denotes keys which are used for input operation such as time setting; 108, a display unit such as a liquid crystal display on which characters and the like are displayed; and 109, an input/output node for a computer (PC). The above devices are connected to each other through a bus line BL (110).

Figure 2:
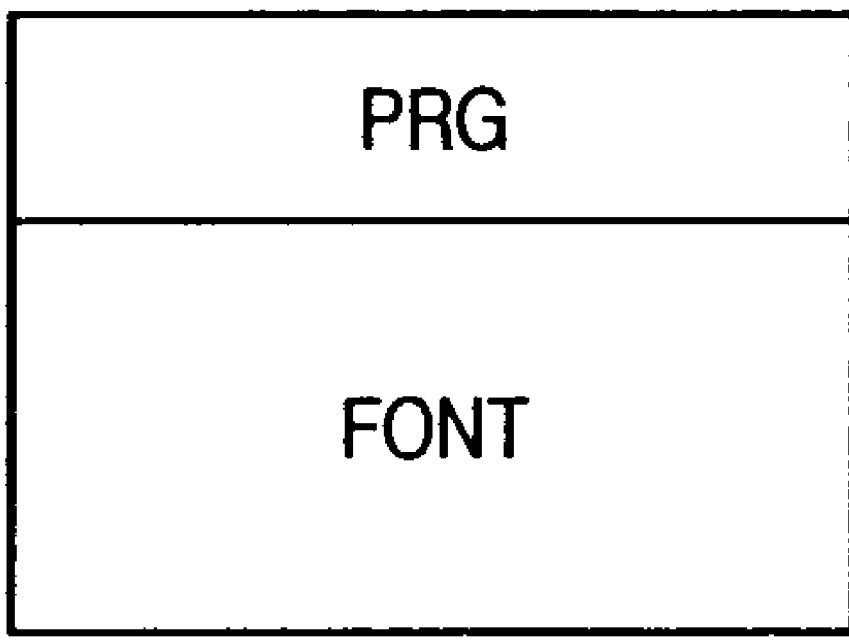
FIG. 2 is a view showing an example of the arrangement of a ROM.

FIG. 2 shows the exemplary arrangement of information stored in the ROM 105. This ROM stores a program (PRG) to be executed by the CPU, font data (FONT) used for display, and the like.

Figure 3:
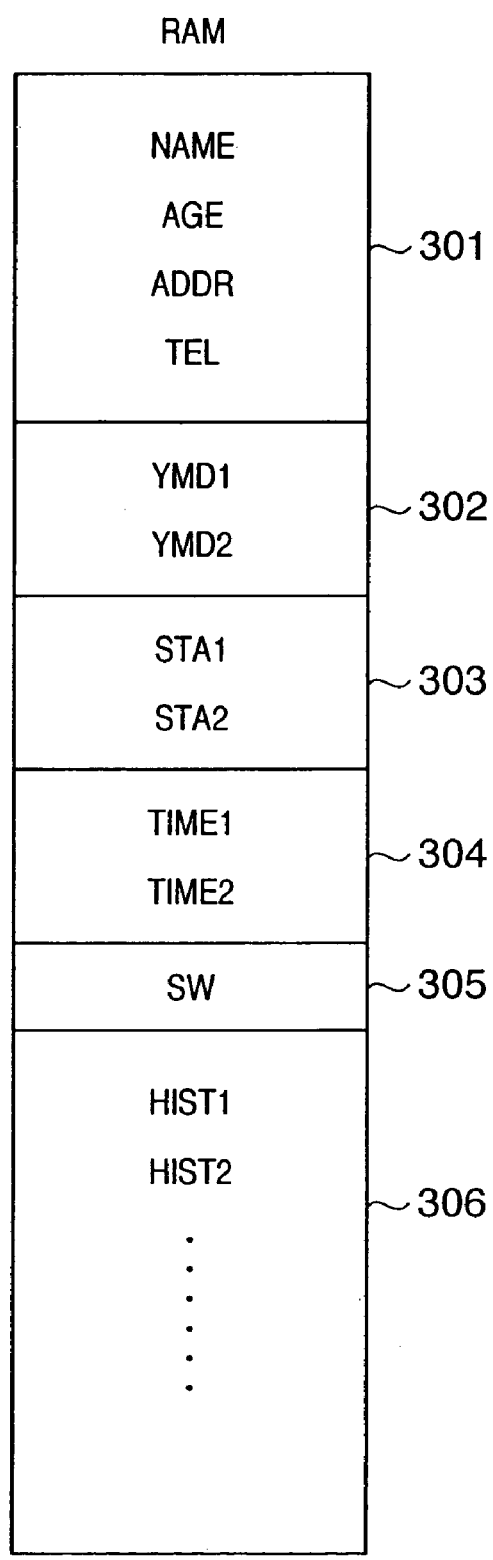
FIG. 3 is a view showing an example of the arrangement of a RAM.

FIG. 3 shows the exemplary arrangement of information stored in the RAM 106. Reference numeral 301 denotes holder information including NAME (name), AGE (age), ADDR (address), TEL (telephone number), and the like; 302, validity term information indicating that this commuter pass is valid from YMD1 (start date) to YMD2 (end date); and 303, information indicating stations in a valid section. In this case, only two stations (STA1 and STA2) are shown. Obviously, however, many stations including transfer stations and the like may be stored, as needed.

Figure 9:
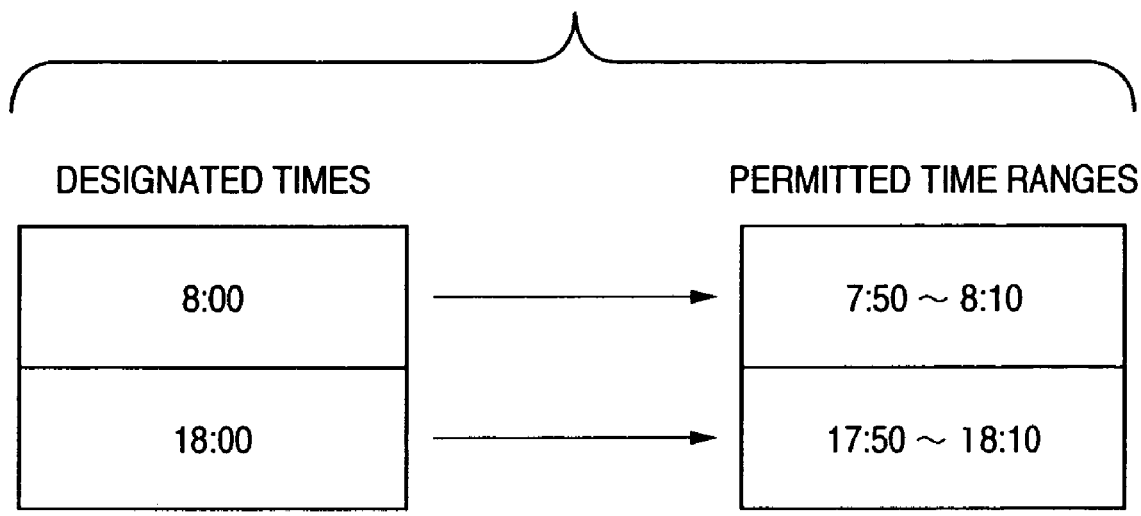
FIG. 9 is a view showing an example of how times are designated.

Reference numeral 304 denotes information about valid times that can be set by the holder of this commuter pass. In this case, two valid times, i.e., TIME1 and TIME2, are set. These valid times have widths (and hence can be called valid terms). For example, as shown in FIG. 9, TIME1 set to 8:00 a.m. indicates that information can be transmitted between 7:50 a.m. and 8:10 a.m. In this case, a width of 10 min is set before and after the set time. If a communication start time (START_TIME1) and communication end time (END_TIME2) are stored in a pair, a communication permission term can be freely set. Alternatively, a communication start time (START_TIME) and communication permission term (AVAILABLE_TERM) may be stored in a pair. Although the times at which communication is permitted are designated in this embodiment, the times at which communication is prohibited may be input and designated.

Reference numeral 305 denotes switch information. When the switch is in the ON state (SW=1), the transmission of information is permitted. When the switch is in the OFF state (SW=0), the transmission of information is prohibited. In other embodiments, the switch may be in the other state such as SW=2, 3 or the like. For example, if SW=2, the transmission of information may be prohibited according to condition of a corresponding communication entity.

Reference numeral 306 denotes an outgoing information log. As the log registration area becomes full, information is sequentially deleted from the start.

Figure 4:
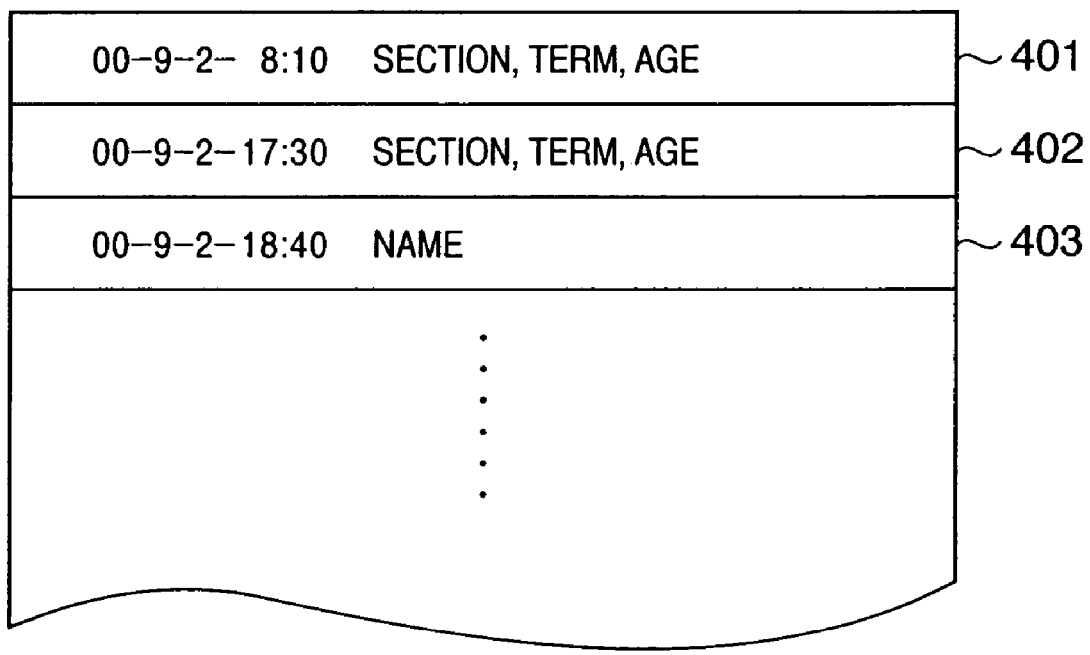
FIG. 4 is a view showing a print example of information.

FIG. 4 shows an example in which a commuter pass card is connected to a computer, and the log information stored in the commuter pass card is printed by a printer. Date, time, and transmission contents are printed in each field in the order named from the left. In the case shown in FIG. 4, with regards to fields 401 and 402, it is expected from the transmission times that the data were transmitted to a ticket gate. With regard to a field 403, however, only the name was transmitted, and hence it can be expected that this data was transmitted to something other than a ticket gate.

Figure 5:
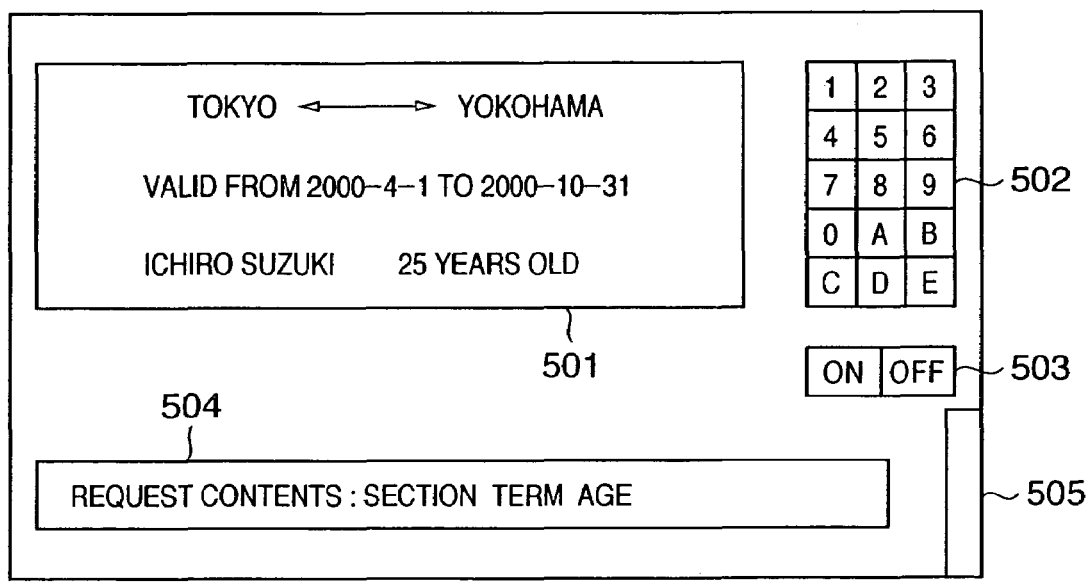
FIG. 5 is a view showing an exemplary outer appearance of a card.

FIG. 5 shows an outer appearance of an exemplary commuter pass card. Reference numeral 501 denotes a printing surface on which the contents of the commuter pass are printed; 502, a key group for setting valid times; 503, a permission/prohibition switch for information transmission; 504, a display unit such as a liquid crystal display, on which the types of information required are displayed; and 505, a contact terminal (interface) for a computer.

Figure 6:
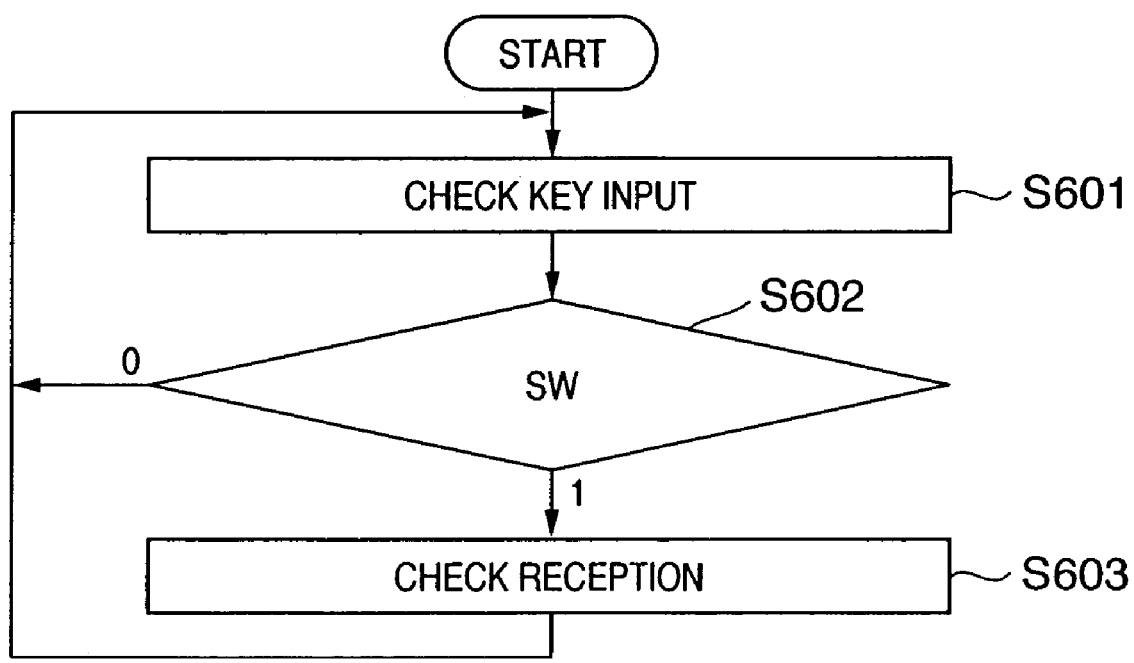
FIG. 6 is a flow chart showing an exemplary process in the main routine.
Figure 7:
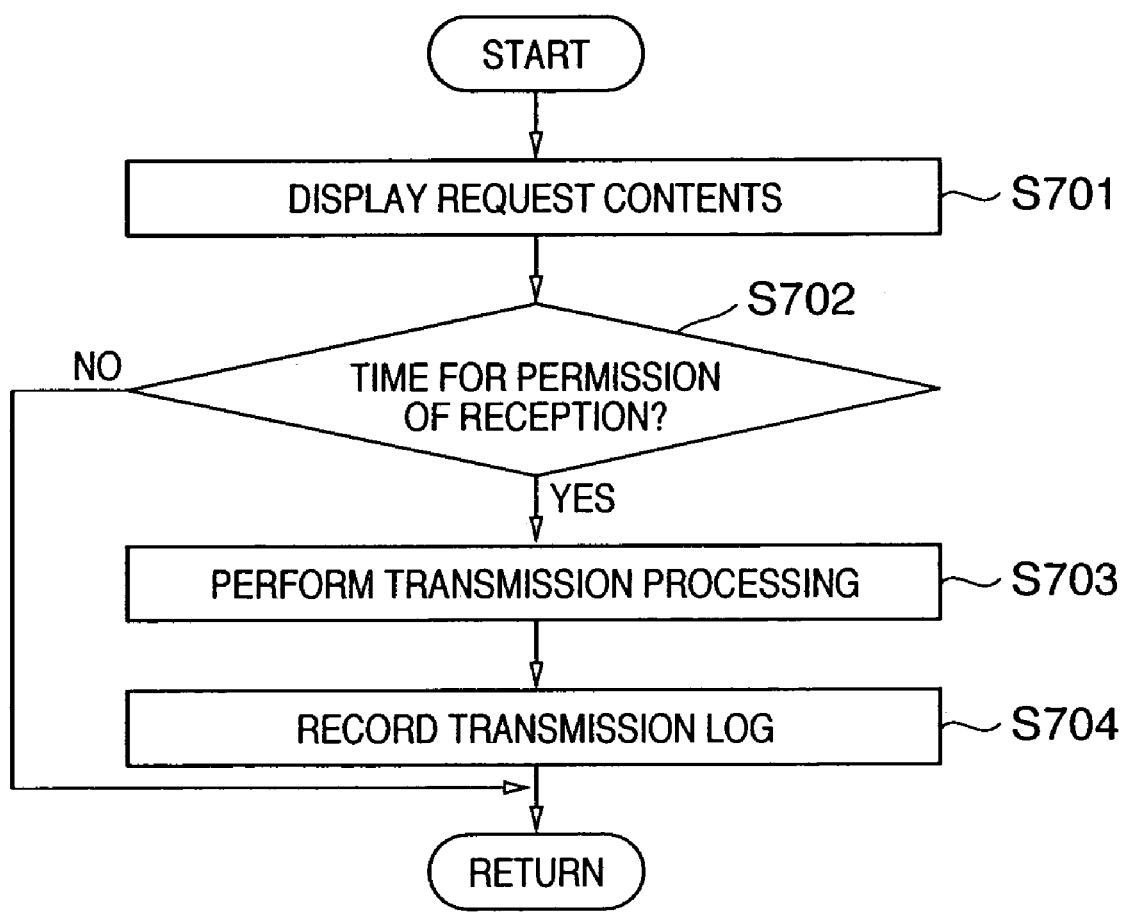
FIG. 7 is a flow chart showing an exemplary process at the time of reception of a request.
Figure 8:
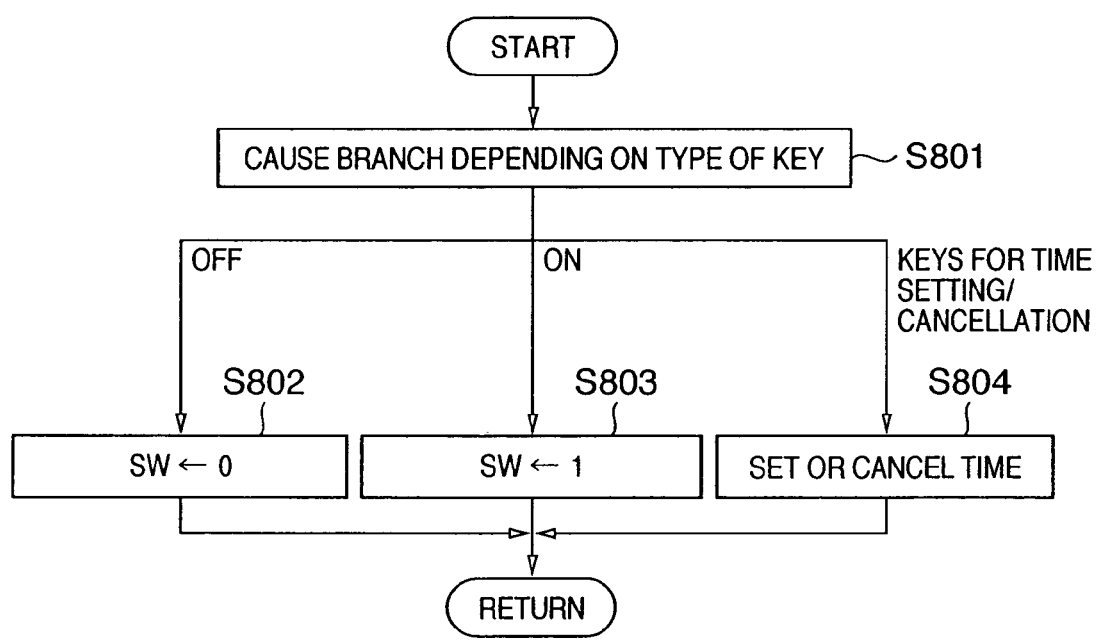
FIG. 8 is a flow chart showing an exemplary process at the time of input operation.

The flow of processing in this embodiment will be described below with reference to the exemplary flow charts of FIGS. 6 to 8. These flow charts concern control programs stored in the ROM 105 or the like, which are basically executed by the CPU 104. Note that the process in FIG. 6 is the main routine, and the processes in FIGS. 7 and 8 are interrupt processes. When the processes in FIGS. 7 and 8 are terminated, therefore, the flow returns to interrupt points in the main routine of FIG. 6.

The main routine of FIG. 6 will be described first. In step S601, the CPU 104 checks a key input. If there is a key input, the flow jumps to the flow chart of FIG. 8 by an interrupt process.

In step S602, the CPU 104 checks the state of the switch. If the switch information stored in the RAM is 0, since information transmission is prohibited, the CPU 104 performs control not to receive any information either. If the switch information is 1, since information transmission is permitted, the flow advances to the reception check in step S603.

In step S603, if information is actually received in a standby state, the flow jumps to the flow chart of FIG. 7 by an interrupt processing. If no information is received for a predetermined period of time, the flow returns to the key input check in step S601.

An interrupt process in the case shown in FIG. 7 in which information is received will be described next. When information is received, the request contents are displayed on the display unit in step 701.

In step S702, it is checked whether the current time is the time when reception/transmission is permitted. For example, the CPU 104 receives the information of the current time transmitted from a timer mounted in the pass card or a ticket gate, and executes this decision processing. Upon determining that the current time is a reception/transmission permission time, the CPU 104 transmits information in accordance with the request contents in step S703. In step S704, the CPU 104 records a transmission log.

If the CPU 104 determines in step S702 that the current time is not a reception/transmission permission time, the flow returns to the main routine without transmitting any information.

An interrupt process in the case shown in FIG. 8 in which key input operation is done will be described next.

First of all, in step S801, the type of input key is discriminated, and the flow branches to the corresponding step. In this case, the switch is also included in the classification of keys.

When the switch 503 is turned off, the CPU 104 sets 0 to SW in the RAM 106 (step S802). When the switch 503 is turned on, the CPU 104 sets 1 to SW (step S803).

When time setting/canceling operation is performed with the key group 502, the CPU 104 performs time setting/canceling processing (step S804).

In the above embodiment, transmission information is recorded. However, reception request information may also be recorded. In this case, the above processing may be so changed as to perform at least reception regardless of whether the switch is OFF.

A battery may be used alone as a power supply for a commuter pass. Alternatively, a commuter pass may be designed to operate on electricity generated by received radio waves like a data carrier or the like.

This embodiment has exemplified the commuter pass for passage through a ticket gate. However, the embodiment is not limited to transport facilities or the like and can also be applied to an entrance card or the like which is used to simply enter and exit a room.

In the above embodiment, a program is stored in the ROM. However, a rewritable memory may be used as the ROM, so that the program may be rewritten through a dedicated computer or the like.

In the above embodiment, the program stored in the ROM is executed by the CPU. However, part or all of the program may be implemented by a hardware circuit to implement the present invention.

The card of the above embodiment includes the keys and switch. Obviously, however, these components may be provided outside the card. For example, the user may access the card 102 from, for example, a PC or cell phone including a contact and/or non-contact card interface, and transfers the information input with the keyboard of the PC to store it.

In the above embodiment, the card designed to perform communication in a non-contact scheme has been described. However, the present invention may be an apparatus such as a cell phone or portable information terminal which incorporates an arrangement (e.g., an IC) capable of implementing each function of the card described with reference to FIG. 1.

Examples for implementing the present invention described in the above embodiment will be described below.

In the above embodiment, time is used as one of the exemplary conditions, however, those skilled in the art should recognize that other equivalent condition may alternatively be used. Also combination of these conditions may alternatively be applied.

EXAMPLE 1

A non-contact communication type card according to Example 1 includes, for example, a communication component which communicates information in a non-contact state, a time designation component which designates a communication permission time, and a communication control component which determines, upon receiving a communication request, whether or not the communication permission time designated by the time designation component has been reached, permits communication by the communication component when determining that the permission time has been reached, and prohibits communication by the communication component when determining that the permission time has not been reached.

EXAMPLE 2

A non-contact communication type card according to Example 2, in the non-contact communication type card according to Example 1, further includes a designation component which designates permission/prohibition of communication, and the communication control component further prohibits communication by the communication component if prohibition of communication is designated by the designation component.

EXAMPLE 3

A non-contact communication type card according to Example 3, in the non-contact communication type card according to Example 1, further includes a recording component which records a log of communication performed by the communication component.

EXAMPLE 4

A non-contact communication type card according to Example 4, in the non-contact communication type card according to Example 1, further includes a display component which displays information communicated by the communication component.

EXAMPLE 5

A non-contact communication type card according to Example 5 includes a communication component which communicates information in a non-contact state, a designation component which designates permission/prohibition of communication, and a communication control component which prohibits communication by the communication component when prohibition of communication is designated by the designation component.

EXAMPLE 6

A non-contact communication type card according to Example 6 includes a communication component which communicates information in a non-contact state, a recording component which records a log of communication performed by the communication component, and a display component which displays information recorded by the recording component.

EXAMPLE 7

A method according to Example 7 is a non-contact communication apparatus control method of controlling a non-contact communication apparatus which has a communication component which communicates information in a non-contact state, including a time designation step of designating a communication permission time, and a communication control step of determining, upon receiving a communication request, whether or not the communication permission time designated in the time designation step has been reached, permitting communication by the communication component when determining that the permission time has been reached, and prohibiting communication by the communication component when determining that the permission time has not been reached.

EXAMPLE 8

In a method according to Example 8, in the method according to Example 7, the non-contact communication apparatus further includes a designation component which designates permission/prohibition of communication, and in the communication control step, communication by the communication component is further prohibited if prohibition of communication is designated by the designation component.

EXAMPLE 9

A method according to Example 9, in the method according to Example 7, further includes a recording step of recording a log of communication performed by the communication component.

EXAMPLE 10

A method according to Example 10, in the method according to Example 7, further includes a display step of displaying information communicated by the communication component.

EXAMPLE 11

A control method for a non-contact communication apparatus according to Example 11 is a control method for a non-contact communication apparatus which has a communication component which communicates information in a non-contact state, and a designation component which designates permission/prohibition of communication, including a communication control step of prohibiting communication by the communication component when prohibition of communication is designated by the designation component.

EXAMPLE 12

A method according to Example 12 is a control method for a non-contact communication apparatus which has a communication component which communicates information in a non-contact state, including a recording step of recording a log of communication performed by the communication component, and a display step of displaying information recorded in the recording step.

EXAMPLE 13

A computer-executable program according to Example 13 is a computer program for controlling a non-contact communication apparatus which has a communication component which communicates information in a non-contact state, the program causing a computer to execute a time designation step of designating a communication permission time, and a communication control step of determining, upon receiving a communication request, whether or not the communication permission time designated in the time designation step has been reached, permitting communication by the communication component when determining that the permission time has been reached, and prohibiting communication by the communication component when determining that the permission time has not been reached.

EXAMPLE 14

A computer-executable program according to Example 14 is a computer program for controlling a non-contact communication apparatus which has a communication component which communicates information in a non-contact state, and a designation component which designates permission/prohibition of communication, the program causing a computer to execute a communication control step of prohibiting communication by the communication component when prohibition of communication is designated by the designation component.

EXAMPLE 15

A computer-executable program according to Example 15 is a computer program for controlling a non-contact communication apparatus which has a communication component which communicates information in a non-contact state, the program causing a computer to execute a recording step of recording a log of communication performed by the communication component, and a display step of displaying information recorded in the recording step.

As has been described above, according to the present invention, leakage of information from a non-contact type card can be prevented. In addition, since limitations can be imposed on the exchange of information, the chance of theft of information can be reduced. Furthermore, the exchange of information can be checked. Moreover, recording the exchange of information will help prevent theft of information.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A non-contact communication card comprising:
a communication component which communicates information in a non-contact state;
a time setting component which sets a communication permission time period in advance, the communication permission time period being designated by a user; and
a communication control component which determines, upon receiving a communication request, whether or not the current time at which the communication request is received is within the communication permission time period set in advance by said time setting component, permits communication by said communication component when determining that the current time is within the communication permission time period, and prohibits communication by said communication component when determining that the current time is not within the communication permission time period.

2. The card according to claim 1, wherein the card further comprises a designation component which designates permission/prohibition of communication, the permission/prohibition of communication being set by the user, and said communication control component further prohibits communication by said communication component if prohibition of communication is designated by said designation component.

3. The card according to claim 1, further comprising a recording component which records log information of communication performed by said communication component.

4. The card according to claim 1, further comprising a display component which displays information communicated by said communication component.

5. The card according to claim 1, wherein the user sets the communication permission time period by setting a start time at which communication by said communication component is permitted and an end time at which communication by said communication component is no longer permitted.

6. The card according to claim 1, wherein the user sets the communication permission time period by setting a valid time at which communication by said communication component is permitted and by setting a width of time before and after the valid time, during which communication by said communication component is permitted.

7. The card according to claim 1, wherein the user sets the communication permission time period by setting a start time at which communication by said communication component is permitted and by setting a width of time after the start time, during which communication by said communication component is permitted.

8. A method of controlling a non-contact communication apparatus which has a communication component which communicates information in a non-contact state, comprising:
   a time setting step of setting a communication permission time period in advance, the communication permission time period being designated by a user; and
   a communication control step of determining, upon receiving a communication request, whether or not the current time at which the communication request is received is within the communication permission time period set in advance in the time setting step, permitting communication by the communication component when determining that the current time is within the communication permission time period, and prohibiting communication by the communication component when determining that the current time is not within the communication permission time period.

9. The method according to claim 8, wherein the non-contact communication apparatus further comprises a designation component which designates permission/prohibition of communication, the permission/prohibition of communication being set by the user, and in the communication control step, communication by the communication component is further prohibited if prohibition of communication is designated by the designation component.

10. The method according to claim 8, further comprising a recording step of recording log information of communication performed by the communication component.

11. The method according to claim 8, further comprising a display step of displaying information communicated by the communication component.

12. The method according to claim 8, wherein the user sets the communication permission time period by setting a start time at which communication by the communication component is permitted and an end time at which communication by the communication component is no longer permitted.

13. The method according to claim 8, wherein the user sets the communication permission time period by setting a valid time at which communication by the communication component is permitted and by setting a width of time before and after the valid time, during which communication by the communication component is permitted.

14. The method according to claim 8, wherein the user sets the communication permission time period by setting a start time at which communication by the communication component is permitted and by setting a width of time after the start time, during which communication by the communication component is permitted.

15. A computer program product for controlling a non-contact communication apparatus which has a communication component which communicates information in a non-contact state, the program causing a computer to execute:
   a time setting step of setting a communication permission time period in advance, the communication permission time period being designated by a user; and
   a communication control step of determining, upon receiving a communication request, whether or not the current time at which the communication request is received is within the communication permission time period set in advance in the time setting step, permitting communication by the communication component when determining that the current time is within the communication permission time period, and prohibiting communication by the communication component when determining that the current time is not within the communication permission time period.

16. The computer program product according to claim 15, wherein the user sets the communication permission time period by setting a start time at which communication by the communication component is permitted and an end time at which communication by the communication component is no longer permitted.

17. The computer program product according to claim 15, wherein the user sets the communication permission time period by setting a valid time at which communication by the communication component is permitted and by setting a width of time before and after the valid time, during which communication by the communication component is permitted.

18. The computer program product according to claim 15, wherein the user sets the communication permission time period by setting a start time at which communication by the communication component is permitted and by setting a width of time after the start time, during which communication by the communication component is permitted.

* * * * *

UNITED STATES PATENT AND TRADEMARK OFFICE
CERTIFICATE OF CORRECTION

PATENT NO. : 7,073,722 B2  Page 1 of 1
APPLICATION NO. : 10/718604
DATED : July 11, 2006
INVENTOR(S) : Kazunori Sugitani It is certified that error appears in the above-identified patent and that said Letters Patent is hereby corrected as shown below:

On The Title Page
Item (56) References Cited, FOREIGN PATENT DOCUMENTS
"08147509 A" should read -- 8-147509 A --;
"08213942 A" should read -- 8-213942 A --;
"11007556 A" should read -- 11-007556 A --;
"2000172888 A" should read -- 2000-172888 A --; and
"2001283161 A" should read -- 2001-283161 A --.

COLUMN 1:
Line 59, "With" should read -- with --.

COLUMN 2:
Line 27, "an" should read -- a --; and
Line 54, "designate" should read -- designate that --.

COLUMN 4:
Line 37, "step 701." should read -- step S701. --.

COLUMN 5:
Line 37, "condition" should read -- conditions --.

Signed and Sealed this

Eighteenth Day of March, 2008

JON W. DUDAS
*Director of the United States Patent and Trademark Office*